United States Patent [19]

Pastorino et al.

[11] Patent Number: 4,892,854

[45] Date of Patent: Jan. 9, 1990

[54] DISPERSIONS AND THE PREPARATION OF FOAMED RESINS THEREFROM

[75] Inventors: Ronald L. Pastorino, Larkspur; Lawrence A. Bock, Walnut Creek, both of Calif.

[73] Assignee: Witco Corporation, New York, N.Y.

[21] Appl. No.: 293,890

[22] Filed: Jan. 5, 1989

[51] Int. Cl.⁴ .............................................. C08J 9/08
[52] U.S. Cl. .................................. 502/160; 252/350; 521/69; 521/72; 521/84.1; 521/88; 521/92; 521/96; 521/138
[58] Field of Search ....................... 502/160; 252/350; 521/69, 72, 84.1, 88, 92, 96, 138

[56] References Cited

U.S. PATENT DOCUMENTS

| | | | |
|---|---|---|---|
| 3,224,983 | 12/1965 | D'Alelio | 260/2.5 |
| 3,479,303 | 11/1968 | Wieschollek et al. | 260/2.5 |
| 3,507,800 | 4/1970 | Leveskis et al. | 252/186 |
| 4,016,112 | 5/1977 | Kajiura et al. | 260/2.5 |
| 4,028,289 | 6/1977 | Brown | 260/2.5 |
| 4,189,501 | 2/1982 | Fulton, Jr. | 424/338 |
| 4,350,681 | 9/1982 | Fulton, Jr. | 424/53 |
| 4,515,928 | 5/1985 | Schwarz | 526/200 |
| 4,692,427 | 9/1987 | Pastorino et al. | 502/160 |
| 4,711,909 | 12/1987 | Pastorino et al. | 521/69 |

*Primary Examiner*—Morton Foelak
*Attorney, Agent, or Firm*—Lockwood, Alex, FitzGibbon & Cummings

[57] ABSTRACT

A storage stable aqueous dispersion useful in the curing and foaming of unsaturated polyester resins comprising an aromatic diacyl peroxide, an alkali metal carbonate or bicarbonate, dispersion-stabilizing amount of magnesium aluminum silicate and an alkali metal carboxymethyl cellulose, glycerol and water. As an optional component this composition can also contain an anionic dispersing agent. Also disclosed is the preparation of foamed polyester resins using the dispersion.

27 Claims, No Drawings

DISPERSIONS AND THE PREPARATION OF FOAMED RESINS THEREFROM

BACKGROUND OF THE INVENTION

This invention relates to new compositions and to the preparation of foamed polyester resins therefrom. In particular, it relates to storage stable dispersions of symmetrical or asymmetrical aromatic diacyl peroxides and their use in the curing and foaming of unsaturated polyester resins.

The use of aromatic diacyl peroxides as polymerization initiators is particularly important in the curing and foaming of unsaturated polyester resins. This technique is useful in the preparation of shaped objects.

The preparation of foamed polymeric products can be accomplished by the introduction of compounds which liberate carbon dioxide as a blowing agent into the polyester resin. U.S. Pat. No. 3,224,983 discloses the use of organic carbonates, such as sodium carbonate and sodium bicarbonate for this purpose.

Other patents showing the use of carbonates and bicarbonates to produce foamed polyester products include U.S. Pat. No. 4,016,112 which uses phosphoric and phosphorous acid esters to react with such carbonates and bicarbonates at temperatures as low as 20° C.; U.S. Pat. Nos. 3,479,303 and 4,028,289 which describe stabilized polyester resin products foamed by the use of bicarbonate of soda; and U.S. Pat. No. 4,347,331 uses the reaction product of aqueous aluminum hydroxie chloride solution and inorganic carbonate or bicarbonate compounds.

The use of aromatic diacyl peroxide as a polymerization initiator is also known and reported in the literature. Previously referred to U.S. Pat. No. 4,016,112 discloses the use of polymerization initiators in the production of cured foamed structures using the carbonic acid gas generated by the reaction of metal carbonates or bicarbonates with acid substances containing various peroxides including benzoyl peroxide, di-tertiary butylperoxide, etc. The use of peroxide catalysts for the preparation of foamed polyester resins is also disclosed in U.S. Pat. No. 4,028,289.

U.S. Pat. No. 4,692,427 discloses aqueous dispersions of symmetrical and asymmetrical aromatic diacylperoxides. The use of these dispersions in making a foamed polyester resin is claimed in our U.S. Pat. No. 4,711,909.

Just as aqueous dispersions of organic peroxides and their use as polymerization initiators are well known, it is also appreciated that the use of these aqueous dispersions can have certain drawbacks in many systems which are sensitive to the presence of large quantities of water. For example, U.S. Pat. No. 3,507,800 which is directed to providing aqueous dispersions of organic peroxides, acknowledges the need to reduce the percentage of water in the dispersion for certain applications (see column 2, lines 16–19).

On the other hand, reducing the percentage of water in aqueous dispersions leads to an increase in the viscosity of the dispersion, affecting the pumpability of the dispersion.

Accordingly, it is an object of the present invention to reduce the water content of dispersions of aromatic diacyl peroxides.

It is another object of the present invention to devise dispersions useful for the curing and foaming of unsaturated polyester resins.

Still another object of the present invention is the preparation of aqueous dispersions of organic diacyl peroxides having reduced viscosities.

Also an object of the present invention is a method for foaming and curing unsaturated polyester resins by the use of a stable composition comprising an organic diacyl peroxide.

Also an object of the present invention is a method for foaming and curing unsaturated polyester resins by an aqueous dispersion of an organic diacyl peroxide having a reduced water content.

Other objects of the present invention will become readily apparent from the ensuing description.

SUMMARY OF THE INVENTION

The present invention has devised stable organic diacyl peroxide dispersions containing reduced amounts of water and capable of use in curing and foaming unsaturated polyester resins.

Generally, the systems of the present invention contain an aromatic diacyl peroxide, an alkali metal carbonate or bicarbonate, magnesium aluminum silicate, an alkali metal carboxymethyl cellulose, glycerol, water and as an optional component, an anionic dispersing agent. The storage stability of this system permits these compositions to be poured, pumped or sprayed into the system containing the unsaturated polyester resin.

In addition, other additives such as, for example, emulsifiers and stabilizers can be added to give the dispersion of this invention desired characteristics depending upon the specific application.

DETAILED DESCRIPTION

Generally the compositions of the present invention comprise a symmetrical or asymmetrical aromatic diacyl peroxide; an alkali metal carbonate or bicarbonate or mixtures thereof; magnesium aluminum silicate; an alkali metal carboxymethyl cellulose; glycerol; and water. As an optional component, the present compositions can also contain an anionic dispersing agent. This optional component can significantly reduce the viscosity of the composition.

The amount of each component in the dispersions of the present invention can be varied depending upon the contemplated end use. Normally the magnesium aluminum silicate and the alkali metal carboxymethyl cellulose are present in a dispersion stabilizing amount. The concentration of aromatic diacyl peroxide can be varied depending on the utility. Glycerol is usually present in the composition in an amount between about 5 and 40 weight percent. In general, it has been found that the following amounts of the components are useful.

| Component | Weight % |
| --- | --- |
| Aromatic Diacyl Peroxide | 2–25 |
| Alkali Metal Carbonate or Bicarbonate | 10–30 |
| Magnesium Aluminum Silicate | 0.1–10 |
| Alkali Metal Carboxymethyl Cellulose | 0.1–10 |
| Anionic Dispersing Agent | 0–1.0 |
| Glycerol | 5–40 |
| Water | Remainder |

The symmetrical or asymmetrical aromatic diacyl peroxides useful in this invention have the following structure:

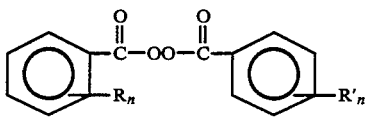

wherein R and R' are independently selected from the group consisting of methyl, ethyl, methoxy, ethoxy and halogen and each n is independently selected from an integer from 0–3.

Among the symmetrical or asymmetrical aromatic diacyl peroxides that can be used in the compositions of this invention are benzoyl peroxide, bis o-toluoyl peroxide, bis (2,4-dichlorobenzoyl) peroxide, benzoyl o-toluoyl peroxide, benzoyl 2, 4-dichlorobenzoyl peroxide, and o-toluoyl 2, 4-dichlorobenzoyl peroxide, and mixtures thereof. Due to its availability and performance characteristics, benzoyl peroxide is a preferred polymerization initiator. It is conveniently added as a wetted material, although it may be added as pure dry granules. Preferably, it is present in a quantity of from about 5 to about 20 weight percent of the dispersion.

The alkali metal carbonates and bicarbonates used in the dispersion, i.e., sodium carbonate, potassium carbonate, sodium bicarbonate and potassium bicarbonate, preferably constitute from about 10 to about 25 weight percent of the dispersion.

The magnesium aluminum silicate and alkali metal carboxymethyl cellulose are present in the dispersion in dispersion stabilizing amounts. Thus the magnesium aluminum silicate can be present in an amount of from about 0.1 to about 10 weight percent of the dispersion, preferably in an amount of from about 0.5 to about 3.0 weight percent of the dispersion.

The alkali metal carboxymethyl cellulose can be present in an amount of from about 0.1 to about 10 weight percent of the dispersion, preferably in an amount of from about 0.5 to about 3.0 weight percent of the dispersion.

The glycerol component can be present in an amount of from about 5 to about 40 weight percent of the dispersion. Normally an amount of glycerol between about 10 to about 30 weight percent of the dispersion will be sufficient to obtain a dispersion having the desired characteristics.

The anionic dispersing agent is an optional component in the present composition. It is particularly useful in lowering the viscosity of the composition. A lower viscosity facilitates application of the composition by making the composition more pumpable and sprayable. While the compositions can be used without this optional component, it is a preferred embodiment of the present invention that an anionic dispersing agent be present in an amount of between about 0.1 and about 1.0 percent by weight of the present composition.

One anionic dispersing agent which has been shown to be effective for lowering the viscosity of the composition is the disodium (half-ester) sulfosuccinate sold by Witco Corporation under its trademark Emcol K8300.

Other anionic dispersing agents useful in the present invention (and their trademarks) are sodium salts of polymerized alkyl naphthalene sulfonic acids (Daxad 16), sulfosuccinate (Emcol 4100), sodium dioctyl sulfosuccinate (Emcol 4500), alkylaryl sulfonate (Dymsol LT), dodecyl diphenyloxide disulfonic acid (Dowfax 2AO), dioctyl sodium sulfo succinate (Denwet CM), sodium lauryl sulfate (Sterling WAQ-CH), sodium lauryl ether sulfate (Sandoz Sulfate 219), dodecylbenzene sulfonic acid (Polystep A-17), sodium alkyl benzene sulfonate (Polystep A-4 and A-16), alkyl naphthalene sodium sulfonate (Petro AA, BA, BAF, etc.), alkyl aryl sulfonate (Dymsol LP) and the like. The foregoing list of anionic dispersing agents is for the purpose of illustration and the present invention should not be construed as being limited thereto.

Sufficient water need be present to form an aqueous dispersion. Thus, the water constitutes the remainder of the content of the dispersion.

The aqueous dispersion of this invention can be prepared by standard procedures for the preparation of dispersions.

Briefly a mixture of water and glycerol is prepared and warmed to about 60° C. Then the alkali metal carboxymethyl cellulose is added followed by the magnesium aluminum silicate. The mixture is cooled to room temperature whereupon the carbonate or bicarbonate is added, followed by the addition of any desired dispersing agents. Finally, with continued stirring, the aromatic diacyl peroxide is added. The desired dispersion can be obtained by passing this mixture through a homogenizer or other suitable mixing device.

Other procedures known to those skilled in this art can be used for preparing the dispersion of the invention.

In order to demonstrate the stability of the aqueous dispersion of this invention the following experiments were performed. Procedure A reports the method used in the preparation of the dispersion of Example 10. The identical procedure, with different amounts of the components, was used to prepare the dispersions of examples 1–9, 11 and 12. Table 1 and 2 contain the details and results of the storage stability tests performed on these dispersions.

PROCEDURE A

A mixture of water (72 grams) and glycerol (48 grams) was heated at 60° C. on a hot plate. Then sodium carboxymethyl cellulose (3.8 g) was added and the mixture was stirred for about 5 minutes. Magnesium aluminum silicate (3.8 g) was next added and stirring and heating was continued for an additional 5 minutes. The suspension was cooled to room temperature with continued stirring and potassium bicarbonate (44 g) was added, followed by the addition of Emcol K8300 (1.0 g). Finally wetted benzoyl peroxide (27.2 g; 69.46% pure) was added and the suspension stirred for about one-half hour. It was then passed through a hand-operated homogenizer.

TABLE 1

| | STORAGE STABILITY OF DISPERSIONS OF BENZOYL PEROXIDE (BPO) CONTAINING GLYCEROL | | | | | | | | |
|---|---|---|---|---|---|---|---|---|---|
| | COMPONENTS (WEIGHT %) | | | | | | | | TIME FOR |
| EXAMPLE | $H_2O$ | GLYCEROL | CELLULOSE COMPOUND | Mg $Al^2$ SILICATE | $KHCO_3$ | EMCOL[3] K8300 | BPO[4] | VISCOSITY (CPS) | SEPARATION AT ROOM TEMPERATURE (Months) |
| 1 | 54.2 | 10.0 | 1.9 | 1.9 | 22.0 | 0.5 | 9.5 | 900 | 1.5 |
| 2 | 60.9 | 11.2 | 2.1 | 2.1 | 12.4 | 0.6 | 10.7 | 1500 | 1.5 |

TABLE 1-continued

STORAGE STABILITY OF DISPERSIONS OF BENZOYL PEROXIDE
(BPO) CONTAINING GLYCEROL

| EXAMPLE | COMPONENTS (WEIGHT %) | | | | | | | VISCOSITY (CPS) | TIME FOR SEPARATION AT ROOM TEMPERATURE (Months) |
|---|---|---|---|---|---|---|---|---|---|
| | $H_2O$ | GLYCEROL | CELLULOSE COMPOUND | Mg $Al^2$ SILICATE | $KHCO_3$ | $EMCOL^3$ K8300 | $BPO^4$ | | |
| 3 | 44.2 | 20.0 | 1.9 | 1.9 | 22.0 | 0.5 | 9.5 | 1300 | 1.5 |
| 4 | 49.6 | 22.5 | 2.1 | 2.1 | 12.4 | 0.6 | 10.7 | 2300 | 2.5 |
| 5 | 34.2 | 30.0 | 1.9 | 1.9 | 22.0 | 0.5 | 9.5 | 1700 | 3–4 weeks |
| 6 | 38.4 | 33.7 | 2.1 | 2.1 | 12.4 | 0.6 | 10.7 | 1700 | 2.0 |

[1] Sodium carboxymethyl cellulose Grade 7L from Hercules, Inc.
[2] Magnabrite HV from American Colloid Co.
[3] Disodium (half-ester) sulfosuccinate anionic dispersing agent, product of Witco Corporation.
[4] Benzoyl peroxide added.

TABLE 2

STORAGE STABILITY OF DISPERSIONS OF BENZOYL PEROXIDE
(BPO) CONTAINING GLYCEROL

| EXAMPLE | COMPONENTS (WEIGHT %) | | | | | | | | VISCOSITY (CPS) | TIME FOR SEPARATION AT ROOM TEMPERATURE (Weeks) |
|---|---|---|---|---|---|---|---|---|---|---|
| | $H_2O$ | GLYCEROL | $CELLULOSE^1$ COMPOUND | Mg $Al^2$ SILICATE | $KHCO_3$ | $EMCOL^3$ K8300 | $BPO^4$ | $BPO^5$ | | |
| 7 | 58.2 | 6.0 | 1.9 | 1.9 | 22.0 | 0.5 | 9.5 | 9.77 | 1,000 | 1.5 |
| 8 | 52.2 | 12.0 | 1.9 | 1.9 | 22.0 | 0.5 | 9.5 | 10.01 | 1,000 | 2 |
| 9 | 46.2 | 18.0 | 1.9 | 1.9 | 22.0 | 0.5 | 9.5 | 9.54 | 1,300 | 1 month |
| 10 | 40.2 | 24.0 | 1.9 | 1.9 | 22.0 | 0.5 | 9.5 | — | 2,600 | 6 |
| 11 | 34.2 | 30.0 | 1.9 | 1.9 | 22.0 | 0.5 | 9.5 | — | 2,300 | 6 |
| $12^6$ | 64.0 | — | 1.9 | 1.9 | 22.0 | 0.2 | 10.0 | 10.76 | 7,400 | — |

[1] Sodium Carboxymethyl cellulose Grade 7L from Hercules, Inc.
[2] Magnabrite HV from American Colloid Co.
[3] Disodium (half-ester) sulfosuccinate anionic dispersing agent, from Witco Corporation.
[4] Benzoyl peroxide added.
[5] Benzoyl peroxide by analysis.
[6] Standard (Product of U.S. Pat. No. 4,692,427).

In use the dispersions of this invention are added to conventional unsaturated polyester resin solutions containing monomer, suitable promoters and surfactants. Since the dispersion contains the polymerization initiator and the carbonate or bicarbonate source of the carbon dioxide gas for foaming the product, the curing and foaming of the unsaturated polyester resin can proceed by the one step addition of this new dispersion and without the application of heat.

The unsaturated polyester resin is a mixture of (i) an unsaturated polymer prepared by condensing an unsaturated acid component, a polyhydric alcohol, and optionally a saturated acid component, and (ii) a vinyl monomer that is copolymerizable with said unsaturated polyester. Unsaturated dicarboxylic acids used in preparing such an unsaturated polyester resin include maleic acid, fumaric acid, itaconic acid, citraconic acid and anhydrides thereof, such as maleic anhydride and itaconic anhydride. Saturated dicarboxylic acids include aliphatic dicarboxylic acids such as adipic acid, sebacic acid and succinic acids, aromatic dicarboxylic acids such as phthalic acid, isophtalic acid and terephtalic acid, anhydrides thereof such as succinic anhydride, and phthalic anhydride and halogenated derivatives of carboxylic acids or their anhydrides such as tetrachlorophthalic anhydride, tetrabromophthalic anhydride, HET acid and an adduct of the Diels-Alder reaction of hexachlorocyclopentadiene with tetrahydrophthalic anhydride.

Polyhydric alcohols include ethylene glycol, propylene glycol, diethylene glycol, dipropylene glycol, trimethylene glycol, butanediol 3, butanediol-1,4, hexanediol-1,6, neopentyl glycol, hydrogenated bisphenol A, a propylene oxide adduct of bisphenol A, glycerin and pentaerythritol. Further, a condensation product of decachlorbiphenyl and monoethanol amine can also be used as a halogen-containing polyhydric alcohol.

Copolymerizable vinyl monomers include styrene, vinyl toluene, -methylstyrene, chlorostyrene, t-butyl styrene, methyl methacrylate, ethyl methacrylate, vinyl acetate, diallyl phthalate and triallyl cyanurate.

Typically, the unsaturated polyester resin is combined with a promoter. Promoted unsaturated polyester resins, particularly aryl-amine promoted unsaturated polyester resins, are generally contemplated for use in the present invention. Tertiary amines are particularly effective promoters for aromatic diacyl peroxides.

Various other additives can also be present with the unsaturated polyester resin, particularly surfactants. For example, silicone surfactants have been used to insure entrapment and uniform dispersion of the gas. Typical silicone surfactants are disclosed in U.S. Pat. No. 4,216,294 and may be used in the present process.

Fillers, thixotropic agents, fire retardants, pigments, dyes, waxes, etc. and reinforcement agents such as glass fibers to modify properties and cost can also be incorporated into the polyester resin composition.

During the making of the foamed product, carbon dioxide gas is liberated from the carbonate or bicarbonate salt by reaction with a source of acid. Acid may be added to the reaction mixture for this purpose. Both inorganic and organic acids may be added to the reaction mixture. The amounts utilized will generally be similar to the amount of acid utilized in prior art processes employing carbon dioxide producing blowing agents. In the present process it is generally found that the polyester resin used in the process already contains sufficient acidic components to react with the carbonate or bicarbonate salt in this type of dispersion. Therefore, no additional acid will generally be required.

The determination of the amount of dispersion necessary to prepare the desired foamed polyester product necessarily depends on the content of the aromatic diacyl peroxide in the dispersions. Normally the use of aromatic diacyl peroxide in an amount between about 0.5 to about 5 weight percent of the unsaturated polyester resin will suffice, although it is preferred that the amount be between about 1 to about 2 weight percent of the resin.

Thus the amount of the dispersion to be used can be between about 2 and 50 weight percent of the unsaturated polyester resin; and preferably between about 4 and 20 weight percent of the resin.

In order to demonstrate the usefulness of the dispersions of this invention in the curing of polyester resins, the following experiments using dispersions of Examples 7-12, were performed. Procedure B contains the general method used in the experiments and Table 3 contains the details and results of the experiments.

percent) to the unsaturated polyester resin and mixing thoroughly.

A portion of the master batch (50.0 grams) was placed into a 6 oz. cup. The aromatic diacyl peroxide dispersion was added in an amount to contain between about 0.5 and 0.75 grams of aromatic diacyl peroxide and mixed by hand for about 20 seconds. The gel time was observed. After the foam was fully cured, it was removed from the cup and cooled for 24 hours. Then the density of the foam was determined by the water displacement method. The appearance of the finished cup of foam was generally firm with a uniform cell structure.

Table 3 contains details of these experiments and the results thereof. In particular the gel time and foam density are reported therein.

TABLE 3

POLYESTER FOAMS PREPARED FROM DISPERSIONS

| EXAMPLE | POLYESTER RESIN | SURFACTANT (L-5340) (% by wt.) | PROMOTER[1] (% by wt.) | DISPERSION EXAMPLE NO. | % DISPERSION ADDED TO RESIN (by wt.) | GEL TIME* | FOAM DENSITY g/cc | lbs/ft |
|---|---|---|---|---|---|---|---|---|
| 13 (a) | SILMAR ® S-4A[2] | 0.75 | 0.23 | 7 | 10 | 2'45" | 0.22 | 13.7 |
| (b) | SILMAR S-4A | 0.75 | 0.23 |   | 15 | 1'30" | 0.17 | 10.6 |
| 14 (a) | SILMAR S-4A | 0.75 | 0.23 | 8 | 10 | 2'30" | 0.24 | 15.0 |
| (b) | SILMAR S-4A | 0.75 | 0.23 |   | 15 | 1'30" | 0.18 | 11.2 |
| 15 (a) | SILMAR S-4A | 0.75 | 0.23 | 9 | 10 | 2'50" | 0.28 | 17.5 |
| (b) | SILMAR S-4A | 0.75 | 0.23 |   | 15 | 1'35" | 0.19 | 11.9 |
| 16 (a) | SILMAR S-4A | 0.75 | 0.23 | 10 | 10 | 2'40" | 0.30 | 18.7 |
| (b) | SILMAR S-4A | 0.75 | 0.23 |   | 15 | 1'25" | 0.23 | 14.3 |
| 17 (a) | SILMAR S-4A | 0.75 | 0.23 | 11 | 10 | 2'45" | 0.37 | 23.1 |
| (b) | SILMAR S-4A | 0.75 | 0.23 |   | 15 | 1'45' | 0.24 | 15.0 |
| 18 (a) | SILMAR S-4A | 0.75 | 0.23 | 12 | 10 | 2'30" | 0.26 | 16.2 |
| (b) | SILMAR S-4A | 0.75 | 0.23 |   | 15 | 1'30" | 0.19 | 11.9 |
| 19 |   |   |   | CONTROL[3] | 1.82 | 4'30" | 1.11 | 69.3 |

*Minute = '; Second = "
[1]Dimethylaniline
[2]Product of Silmar Division of Standard Oil Engineered Material Co.
[3]55% by weight benzoyl peroxide paste, BZQ-55

PROCEDURE B

The dispersions of Examples 7-12 were tested as catalysts for curing an unsaturated polyester resin (Silmar S-4A). In this regard, Examples 13-17 (of Table 3) included the dispersions of Examples 7-11, respectively, each of which contains glycerol and reduced amounts of water; Example 18 included the dispersion of Example 12 which contains a higher amount of water than the dispersions of Examples 7-11 and which does not contain glycerol; Example 19 included a standard benzoyl peroxide paste rather than a benzoyl peroxide dispersion.

A master batch of the polyester resin was prepared by adding dimethyl aniline (0.23 weight percent) and Union Carbide L5340 silicone surfactant (0.75 weight In order to demonstrate the advantage of having the optional anionic dispersing agent in the dispersion of this invention, a pair of control experiments were performed using Procedure A previously set forth herein. In particular, Example 8 reported in Table 2 was repeated without an anionic dispersing agent (Experiment B) and with 0.5 weight percent of an anionic dispersion agent, Emcol K8300 which is a disodium (half-ester) sulfosuccinate (Experiment A). The results of these experiments are reported in Table 4.

TABLE 4

| EXPERIMENT | COMPONENTS (WEIGHT %) | | | | | | VISCOSITY (CPS) | TIME FOR SEPARATION AT ROOM TEMPERATURE (Weeks) |
|---|---|---|---|---|---|---|---|---|
|   | H2O | GLYCEROL | CELLULOSE[1] COMPOUND | Mg Al[2] SILICATE | KHCO3 | EMCOL[3] K8300 | BPO[4] |   |   |
| A | 52.2 | 12.0 | 1.9 | 1.9 | 22.0 | 0.5 | 9.5 | 2400 | 5.5 |
| B | 52.5 | 12.1 | 1.9 | 1.9 | 22.1 | — | 9.5 | 5200 | 8.0 |

[1]Sodium carboxymethyl cellulose Grade 7L from Hercules, Inc.
[2]Magnabrite HV from American Colloid Co.
[3]Disodium (half-ester) sulfosuccinate anionic dispersing agent from Witco Corporation
[4]Benzoyl peroxide added The results of the experiments reported in Table 4 show that the use of minimal amounts of an anionic dispersing agent significantly reduces the viscosity of the dispersion, a highly desirable and useful feature.

It will be understood that the embodiments of the present invention have been described as merely illustrative of a few of the applications of the principles of the present invention. Numerous modifications may be made by those skilled in the art without departing from the true spirit and scope of the invention.

We claim:
1. An aqueous dispersion for use in foaming and curing polyester resins comprising a symmetrical or asymmetrical aromatic diacyl peroxide; an alkali metal carbonate or bicarbonate or mixtures thereof; dispersion stabilizing amounts of magnesium aluminum silicate and alkali metal carboxymethyl cellulose; glycerol; and sufficient water to form an aqueous dispersion.
2. The aqueous dispersion of claim 1 wherein the symmetrical or asymmetrical aromatic diacyl peroxide has the following structure:

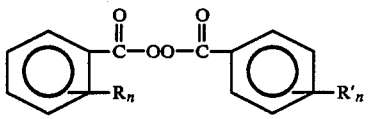

wherein R and R' are independently selected from the group consisting of methyl, ethyl, methoxy, ethoxy and halogen and each n is an integer from 0-3.
3. The aqueous dispersion of claim 2 wherein the symmetrical or asymmetrical aromatic diacyl peroxide is benzoyl peroxide, bis-o-toluoyl peroxide, bis 2, 4-dichlorobenzoyl peroxide, benzoyl o-toluoyl peroxide, benzoyl 2,4-dichlorobenzoyl peroxide, or o-toluoyl 2,4-dichlorobenzoyl peroxide and mixtures thereof.
4. The aqueous dispersion of claim 1 which additionally comprises an anionic dispersing agent.
5. The aqueous dispersion of claim 2 which additionally comprises an anionic dispersing agent.
6. The aqueous dispersion of claim 5 wherein the amount of anionic dispersing agent is between about 0.1 and about 1.0 weight percent of the dispersion.
7. The aqueous dispersion of claim 6 wherein the anionic dispersing agent is disodium (half-ester) sulfosuccinate.
8. The aqueous dispersion of claim 3 wherein the alkali metal carbonate or bicarbonate is potassium bicarbonate.
9. The aqueous dispersion of claim 1 wherein the amount of water plus 91 glycerol is sufficient to form an aqueous dispersion.
10. The aqueous dispersion of claim 3 wherein the alkali metal bicarbonate is sodium bicarbonate.
11. The aqueous dispersion of claim 3 wherein the alkali metal carbonate is potassium carbonate.
12. The aqueous dispersion of claim 3 wherein the alkali metal carbonate is sodium carbonate.
13. The aqueous dispersion of claim 3 wherein the symmetrical or asymmetrical aromatic diacyl peroxide is benzoyl peroxide.
14. The aqueous dispersion of claim 3 wherein the symmetrical or asymmetrical aromatic diacyl peroxide is present in an amount of about 2 to about 25 weight percent of the dispersion.
15. The aqueous dispersion of claim 13 wherein the benzoyl peroxide is present in an amount of from about 5 to about 25 weight percent of the dispersion.
16. The aqueous dispersion of claim 11 wherein the potassium carbonate is present in an amount of from about 10 to about 30 weight percent of the dispersion.
17. The aqueous dispersion of claim 12 wherein the sodium carbonate is present in an amount of from about 10 to about 30 weight percent of the dispersion.
18. The aqueous dispersion of claim 8 wherein the potassium bicarbonate is present in an amount of from about 10 to about 30 weight percent of the dispersion.
19. The aqueous dispersion of claim 10 wherein the sodium bicarbonate is present in an amount of from about 10 to about 30 weight percent of the dispersion.
20. The aqueous dispersion of claim 13 wherein the alkali metal carboxymethyl cellulose is sodium carboxymethyl cellulose.
21. The aqueous dispersion of claim 20 wherein the magnesium aluminum silicate and sodium carboxymethyl cellulose are each present in an amount between about 0.10 and about 10 weight percent of the dispersion.
22. The aqueous dispersion of claim 9 wherein the glycerol is present in an amount of between about 5 and about 40 percent by weight.
23. The aqueous dispersion of claim 9 wherein the glycerol is present in an amount between about 10 and about 30 percent by weight.
24. An aqueous dispersion for use in foaming and curing polyester resins comprising approximately 2-25 weight % of a symmetrical or asymmetrical aromatic diacyl peroxide; approximately 10-30 weight % of an alkali metal carbonate or bicarbonate or mixtures thereof; approximately 0.1-10 weight % of magnesium aluminum silicate; approximately 0.1-10 weight % of an alkali metal carboxymethyl cellulose; approximately 0.1 to 1.0 weight % of an anionic dispersing agent; approximately 5-40 weight % glycerol and sufficient water to form an aqueous dispersion.
25. The aqueous dispersion of claim 24 wherein the symmetrical or asymmetrical aromatic diacyl peroxide is benzoyl peroxide, said alkali metal carbonate or bicarbonate is potassium bicarbonate and said alkali metal carboxymethyl cellulose is sodium carboxymethyl cellulose.
26. The aqueous dispersion of claim 25 wherein the weight % of glycerol is approximately 8-12% and the weight % of bicarbonate is approximately 20-24%.
27. The aqueous dispersion of claim 25 wherein the weight % of glycerol is approximately 20-25% and the weight % of bicarbonate is approximately 10-15%.

* * * * *